United States Patent
Tomita

(10) Patent No.: US 9,176,734 B2
(45) Date of Patent: Nov. 3, 2015

(54) LADDER PROGRAM CREATION APPARATUS

(71) Applicant: YOKOGAWA ELECTRIC CORPORATION, Musashino-shi, Tokyo (JP)

(72) Inventor: Yuse Tomita, Musashino (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 423 days.

(21) Appl. No.: 13/737,283

(22) Filed: Jan. 9, 2013

(65) Prior Publication Data

US 2013/0185620 A1 Jul. 18, 2013

(30) Foreign Application Priority Data

Jan. 12, 2012 (JP) .................................. 2012-004235

(51) Int. Cl.
*G06F 17/24* (2006.01)
*G06F 9/30* (2006.01)
*G05B 19/05* (2006.01)

(52) U.S. Cl.
CPC ............... *G06F 9/30* (2013.01); *G05B 19/056* (2013.01); *G06F 17/245* (2013.01)

(58) Field of Classification Search
CPC ........................................................ G06F 9/30
USPC ........................................................ 715/227
See application file for complete search history.

(56) References Cited

U.S. PATENT DOCUMENTS

| | | | | |
|---|---|---|---|---|
| 5,576,946 | A * | 11/1996 | Bender et al. | 700/17 |
| 6,854,111 | B1 * | 2/2005 | Havner et al. | 717/163 |
| 7,272,458 | B2 * | 9/2007 | Tomita | 700/87 |
| 8,694,959 | B2 * | 4/2014 | Chouinard et al. | 717/110 |
| 2008/0300695 | A1 * | 12/2008 | Bizily et al. | 700/17 |

FOREIGN PATENT DOCUMENTS

| | | | |
|---|---|---|---|
| JP | 5100718 | A | 4/1993 |
| JP | 09258808 | | 10/1997 |
| JP | 2000163109 | A | 6/2000 |
| JP | 2002182709 | A | 6/2002 |
| JP | 2002229612 | A | 8/2002 |

(Continued)

OTHER PUBLICATIONS

Park, Sang C., Chang Mok Park, and Gi-Nam Wang. "A PLC programming environment based on a virtual plant." The International Journal of Advanced Manufacturing Technology 39, No. 11-12 (2008): 1262-1270.*

(Continued)

*Primary Examiner* — Frank D Mills
(74) *Attorney, Agent, or Firm* — Sughrue Mion, PLLC

(57) ABSTRACT

A ladder program creation apparatus may include a command listing table storage unit configured to store a command listing table, the command listing table registering standard command information and custom ladder command information, a custom ladder command information creation unit configured to create the custom ladder command information based on an operation by user, and a custom ladder command information storage control unit configured to register the custom ladder command information, which has been created by the custom ladder command information creation unit, and the standard command information in the command listing table.

17 Claims, 9 Drawing Sheets

Improvement in program readability and reduction in the number of steps

(56) References Cited

FOREIGN PATENT DOCUMENTS

| JP | 200592808 A | 4/2005 |
|----|-------------|--------|
| JP | 200964284 A | 3/2009 |
| JP | 2011192088 A | 9/2011 |

OTHER PUBLICATIONS

"New Product Introduction: UT Advanced Series Digital Indicating Controllers", Yokogawa Technical Report, Yokogawa Electric Corporation, Mar. 8, 2010, p. 56, vol. 53, No. 1.

* cited by examiner

Prior Art

LADDER PROGRAM CREATION APPARATUS

BACKGROUND OF THE INVENTION

1. Field of the Invention

The present invention relates to a ladder program creation apparatus. Specifically, the present invention relates to a ladder program creation apparatus that sets a custom ladder command included in a ladder program.

Priority is claimed on Japanese Patent Application No. 2012-004235, filed Jan. 12, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

One type of control apparatus is an indicating controller that has a sequence control function in a ladder language widely used for PLCs (programmable logic controller), as described in "New Product Introduction: UT Advanced Series Digital Indicating Controllers", Yokogawa Technical Report, Yokogawa Electric Corporation, Mar. 8, 2010, Vol. 53, No. 1 (2010), p. 56.

By utilizing a sequence control function, it has been possible to implement, within a controller, not only the functionality of a controller, but also the functionality of compact PLCs, timers, and switches or the like that have been conventionally used as peripheral devices.

By doing this, it is possible to reduce the conventionally required peripheral devices and interconnections, thereby enabling a reduction of the overall cost.

By using a simple configuration and a familiar ladder language, it is possible to expect a reduction in the labor required for program development.

Additionally, because data within the controller can be used in a ladder program, utilization in various applications can be envisioned, such as input compensation, and the combining of PID control and sequence control.

FIG. 7 is a block diagram illustrating an example of a configuration of a ladder program creation apparatus in which a ladder program is created in a controller in accordance with the related art. The ladder program creation apparatus includes an indicating controller 1, a personal computer 2, and a parameter setting tool program 3 installed in the personal computer 2. In FIG. 7, the personal computer 2 is connected to an indicating controller 1. The parameter setting tool program 3 is provided by the manufacturer of the controller, and is installed in the personal computer 2.

The indicating controller 1 is used by an engineer implementing a sequence control system, who operates the personal computer 2 in which the parameter setting tool program 3 is installed so as to create/input/set a desired ladder program such as shown in FIG. 8 corresponding to the sequence control system that is to be implemented.

FIG. 8 is a view illustrating an example of a display screen of the personal computer 2 when creating a ladder program based on the parameter setting tool program 3 in accordance with the related art. As shown in FIG. 8, a ladder program creation display screen 21 is shown on the display screen of the personal computer 2. The ladder program creation display screen 21 includes a command display area 2a and a program editing area 2b. In the command display area 2a, a plurality of basic commands (for example, 13 types) and application commands (for example, 67 types) based on the parameter setting tool program 3 are displayed. In the example of FIG. 8, the basic commands are 13 types of LD.AND, LDN.ANDN, OR, ORN, OUT, SET, E_SET, RST, E_RST, TIM, CNT, DIFU, and DIFD. The application commands include comparison commands such as GT, LT, GE, LE, EQ, and NEQ and arithmetic operation commands such as ADD, E_ADD, and the like.

The engineer creating the ladder program selects desired commands from a plurality of basic commands and application commands displayed on the command display area 2a. The engineer creates/inputs/sets a desired ladder program by placing the selected commands at prescribed positions in the program editing area 2b.

FIG. 9 is a view representing each of the lines L1 to L7 of the ladder program displayed in the ladder program creation display screen 21 in the form of equations when the ladder program of FIG. 8 is created in accordance with the related art. As shown in FIG. 9, in the program editing area 2b included in the ladder program creation display screen 22, each of the lines L1 to L7 of the ladder program is represented in the form of equations. In the example of FIG. 9, each of the lines L1 to L7 of the ladder program is represented in the form of equations as follows.

1st Line L1: $DAT01+DAT02=DAT10 \rightarrow DAT01+DAT02$

2nd Line L2: $DAT03+DAT04=DAT11 \rightarrow DAT03+DAT04$

3rd Line L3: $DAT10 \div DAT11=DAT10 \rightarrow (DAT01+DAT02)/(DAT03+DAT04)$

4th Line L4: $DAT05+DAT06=DAT11 \rightarrow DAT05+DAT06$

5th Line L5: $DAT07+DAT08=DAT12 \rightarrow DAT07+DAT08$

6th Line L6: $DAT11 \div DAT12=DAT11 \rightarrow (DAT05+DAT06)/(DAT07+DAT08)$

7th Line L7: $DAT10 \times DAT12=DAT11 \rightarrow \{(DAT01+DAT02)/(DAT03+DAT04)\} \times \{(DAT05+DAT06)/(DAT07+DAT08)\}$ The parameter setting tool program 3 installed in the personal computer 2 is a program developed for the purpose of implementing as a software ladder program a circuit implemented on a relay board. Thereby, the parameter setting tool program 3 is capable with regard to coding expressions of input/output processing, and is not good at coding expressions of arithmetic calculation processing.

That is, when coding arithmetic calculation processing in a ladder program based on the parameter setting tool program 3, the coded program becomes complex, as shown in FIG. 8. Thereby, it is difficult from the coded program to read the original equations shown in FIG. 9 on which it is based.

SUMMARY

A ladder program creation apparatus may include: a command listing table storage unit configured to store a command listing table, the command listing table registering standard command information and custom ladder command information; a custom ladder command information creation unit configured to create the custom ladder command information based on an operation by user; and a custom ladder command information storage control unit configured to register the custom ladder command information, which has been created by the custom ladder command information creation unit, and the standard command information in the command listing table.

The ladder program creation apparatus may further include: a display unit configured to display a command display area and a program editing area, the command display area displaying names of the standard command information and the custom ladder command information, the program editing area being constituted to create and input a desired ladder program by dragging and dropping a desired command selected from the standard command information and the custom ladder command information displayed in the command display area.

The ladder program creation apparatus may further include: a program storage unit configured to store the ladder program that has been created; and a parameter setting unit including the custom ladder command information creation unit and the custom ladder command information storage control unit. The parameter setting unit may be configured to write the ladder program, which has been created, into the program storage unit, read out the ladder program from the program storage unit, and write the custom ladder command information into the command listing table in the command listing table storage unit.

The ladder program creation apparatus may further include: an arithmetic unit configured to perform calculations; and a program controller configured to receive executable commands from the program storage unit, output results of processing to the program storage unit, receive command data from the command listing table in the command listing table storage unit, output command codes to the command listing table in the command listing table storage unit, output processing requests to the arithmetic unit, and receive processing results from the arithmetic unit.

The display unit may be configured to display custom ladder command creation screen on which a user creates desired custom ladder command information.

The custom ladder command creation screen may include a registration button. If the registration button is operated, then the custom ladder command information creation unit may register the created custom ladder command information in the command listing table, along with the standard command information.

The custom ladder command information may be coded as an equation.

The custom ladder command information may be coded in a programming language.

A ladder program creation method may include: creating custom ladder command information by using a custom ladder command creation screen; registering the custom ladder command information, which has been created, in a command listing table; displaying names of standard command information and the custom ladder command information, which have been registered in the command listing table, in a command display area in a display unit; creating a desired ladder program by selecting desired commands from the standard command information and the custom ladder command information, the names of which have been displayed in the command display area, and by dragging and dropping the selected commands from the command display area to a program editing area in the display unit.

The ladder program creation method may further include: writing the ladder program, which has been created, into a program storage unit; reading out the ladder program from the program storage unit; and writing the custom ladder command information into the command listing table.

The ladder program creation method may further include: receiving executable commands from the program storage unit; outputting results of processing to the program storage unit; receiving command data from the command listing table; outputting command codes to the command listing table; outputting processing requests to an arithmetic unit; and receiving processing results from the arithmetic unit.

The ladder program creation method may further include: displaying custom ladder command creation screen on which a user creates desired custom ladder command information.

The ladder program creation method may further include: registering the created custom ladder command information in the command listing table, along with the standard command information if a registration button included in the custom ladder command creation screen is operated.

The ladder program creation method may further include: converting the ladder program and custom ladder command information into codes that a indicating controller itself can interpret; registering the converted ladder program and custom ladder command information in the indicating controller; and executing processing of prescribed commands in a sequence in which the prescribed commands are coded in the ladder program.

The custom ladder command information may be coded as an equation.

The custom ladder command information may be coded in a programming language.

A computer program product embodied on a non-transitory computer readable medium may include: instructions to create custom ladder command information by using a custom ladder command creation screen; instructions to register the custom ladder command information, which has been created, in a command listing table; instructions to display names of standard command information and the custom ladder command information, which have been registered in the command listing table, in a command display area in a display unit; instructions to create a desired ladder program by selecting desired commands from the standard command information and the custom ladder command information, the names of which have been displayed in the command display area, and by dragging and dropping the selected commands from the command display area to a program editing area in the display unit.

The computer program product may further include: instructions to display custom ladder command creation screen on which a user creates desired custom ladder command information.

The computer program product may further include: instructions to register the created custom ladder command information in the command listing table, along with the standard command information if a registration button included in the custom ladder command creation screen is operated.

The computer program product may further include: instructions to convert the ladder program and custom ladder command information into codes that a indicating controller itself can interpret; instructions to register the converted ladder program and custom ladder command information in the indicating controller; and instructions to execute processing of prescribed commands in a sequence in which the prescribed commands are coded in the ladder program.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
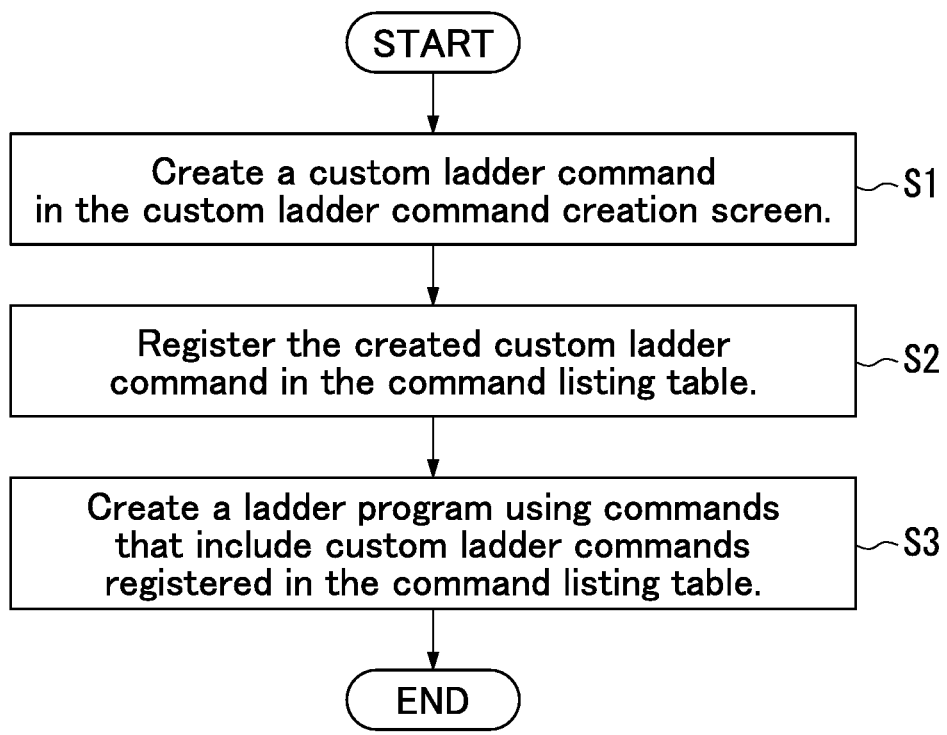
FIG. 1 is a flowchart illustrating a general flow of a ladder program creation processing based on a ladder program generation apparatus in accordance with a first preferred embodiment of the present invention.
Figure 2:
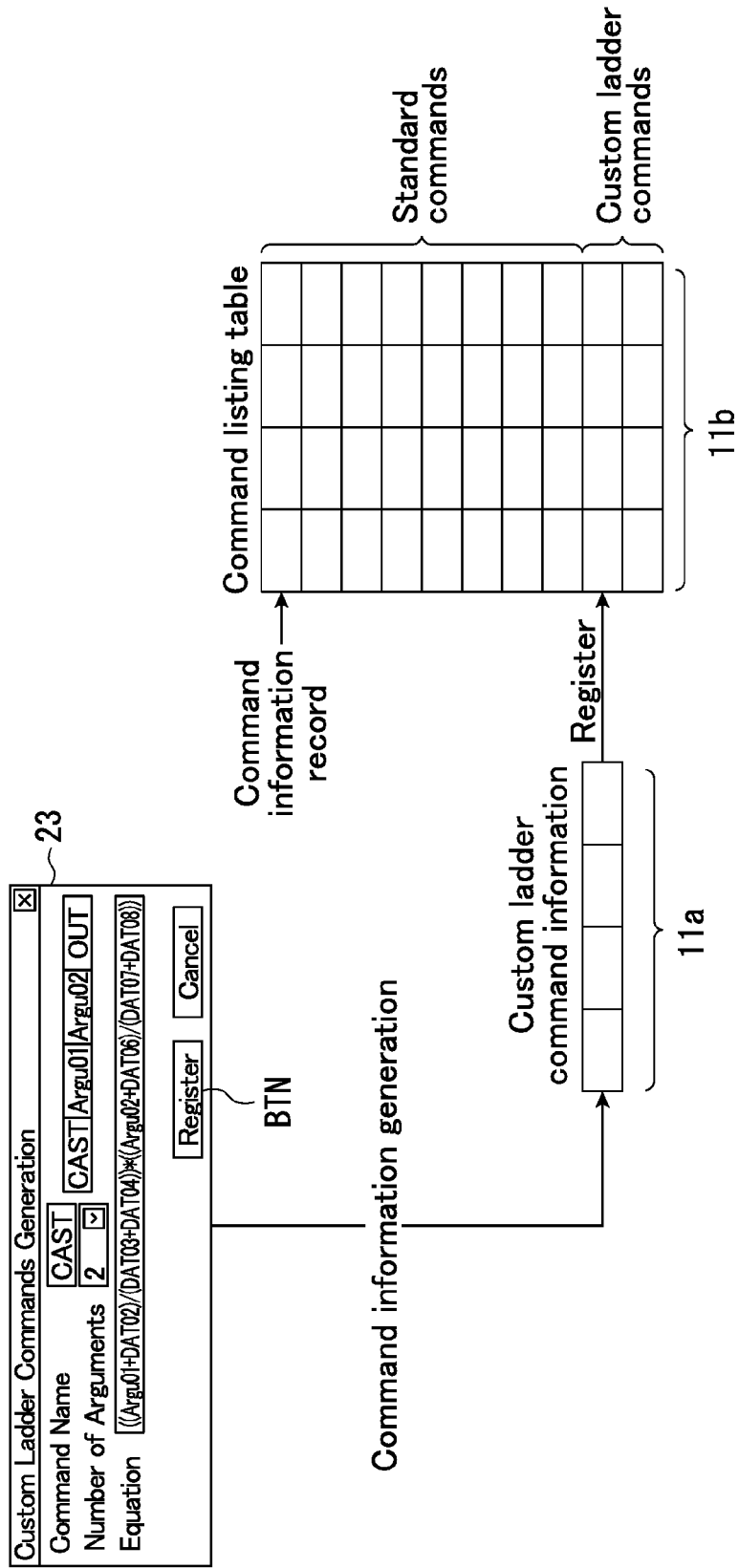
FIG. 2 is a view for describing a custom ladder command creation processing based on the ladder program generation apparatus in accordance with the first preferred embodiment of the present invention.
Figure 3:
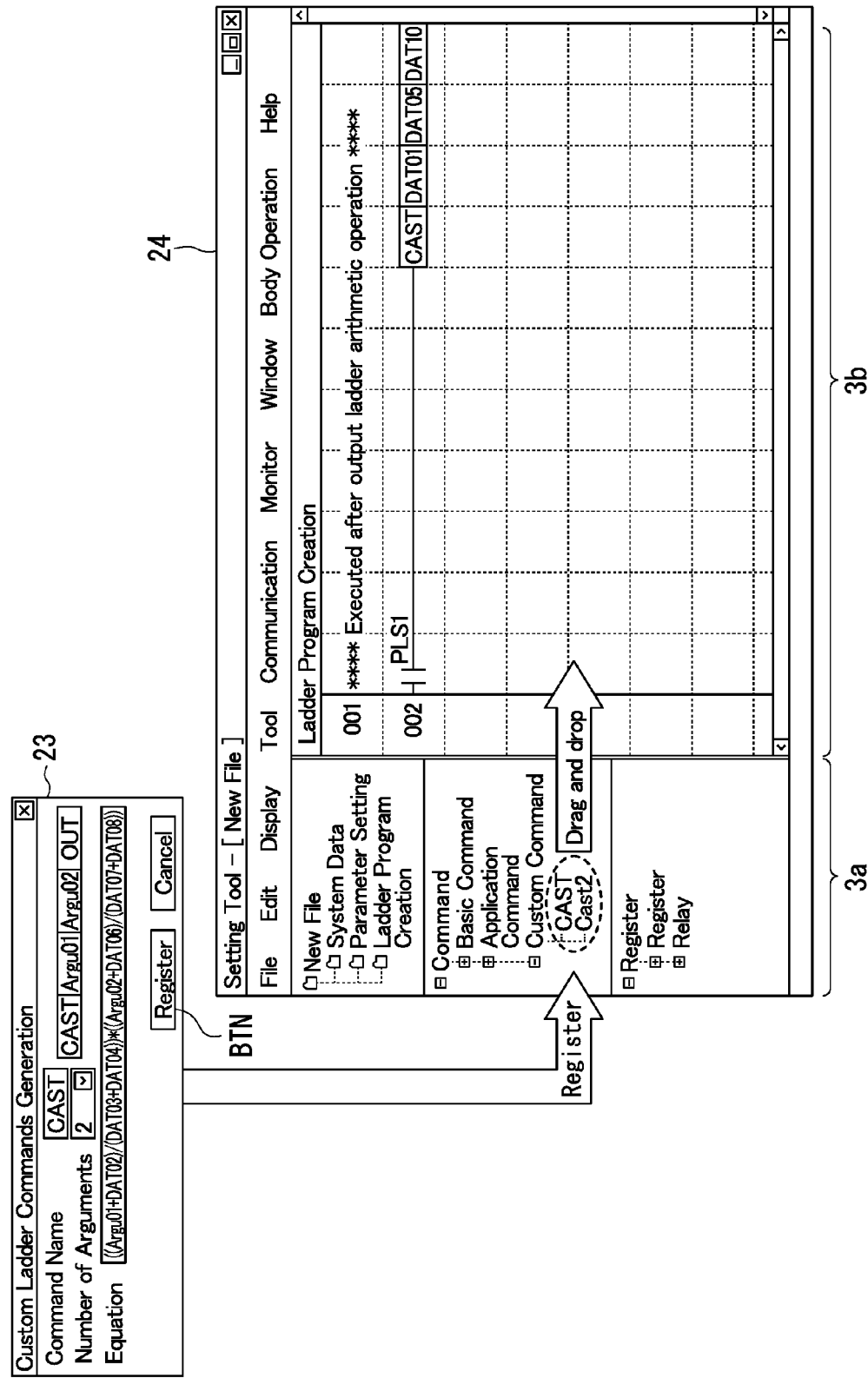
FIG. 3 is a view for describing the ladder program creation processing based on the ladder program generation apparatus in accordance with the first preferred embodiment of the present invention.

A first preferred embodiment of the present invention will be described by using drawings. FIG. 1 is a flowchart illustrating a general flow of a ladder program creation processing based on the ladder program creation apparatus in accordance with the first preferred embodiment of the present invention. FIG. 2 is a view for describing a custom ladder command creation processing based on the ladder program creation apparatus in accordance with the first preferred embodiment of the present invention. FIG. 3 is a view for describing the ladder program creation processing based on the ladder program creation apparatus in accordance with the first preferred embodiment of the present invention.

Figure 7:
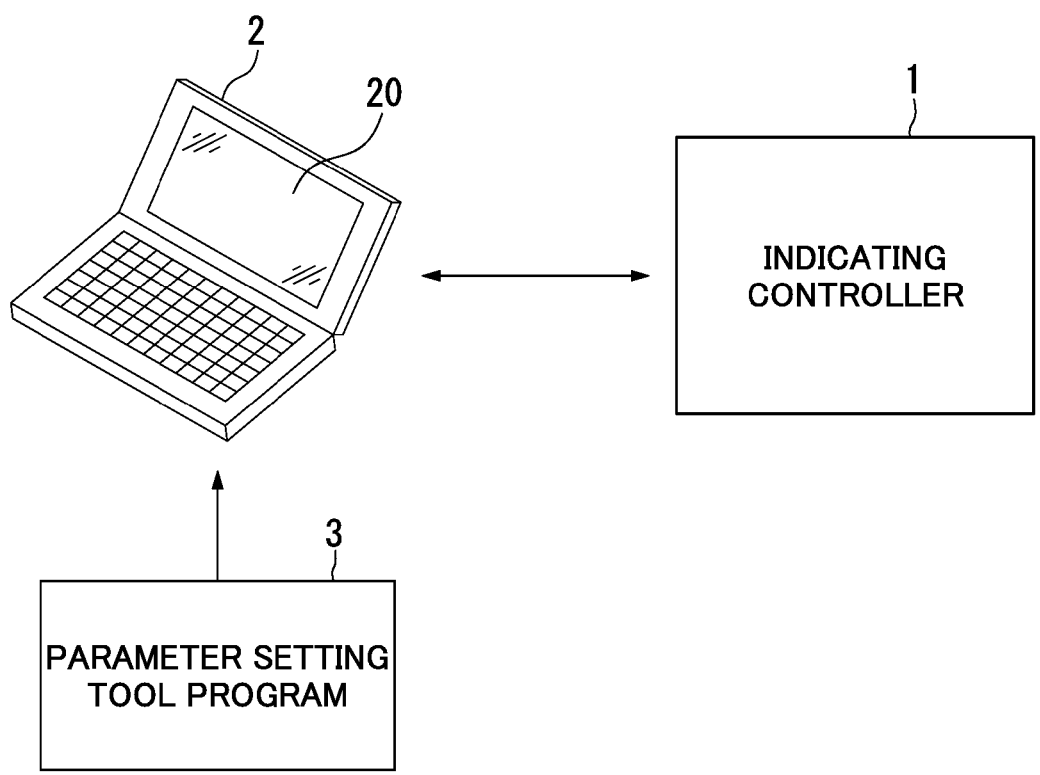
FIG. 7 is a block diagram illustrating an example of a configuration of a ladder program generation apparatus in which a ladder program is created in a controller in accordance with the related art.

The configuration of the ladder program creation apparatus for creating the ladder program is the same as that of the related art shown in FIG. 7. That is, the ladder program creation apparatus includes an indicating controller 1, a personal computer 2, and a parameter setting tool program 3 installed in the personal computer 2.

The personal computer 2 includes a display screen, or connected to a display screen. The display screen may hereinafter be referred to as a display unit.

Figure 8:
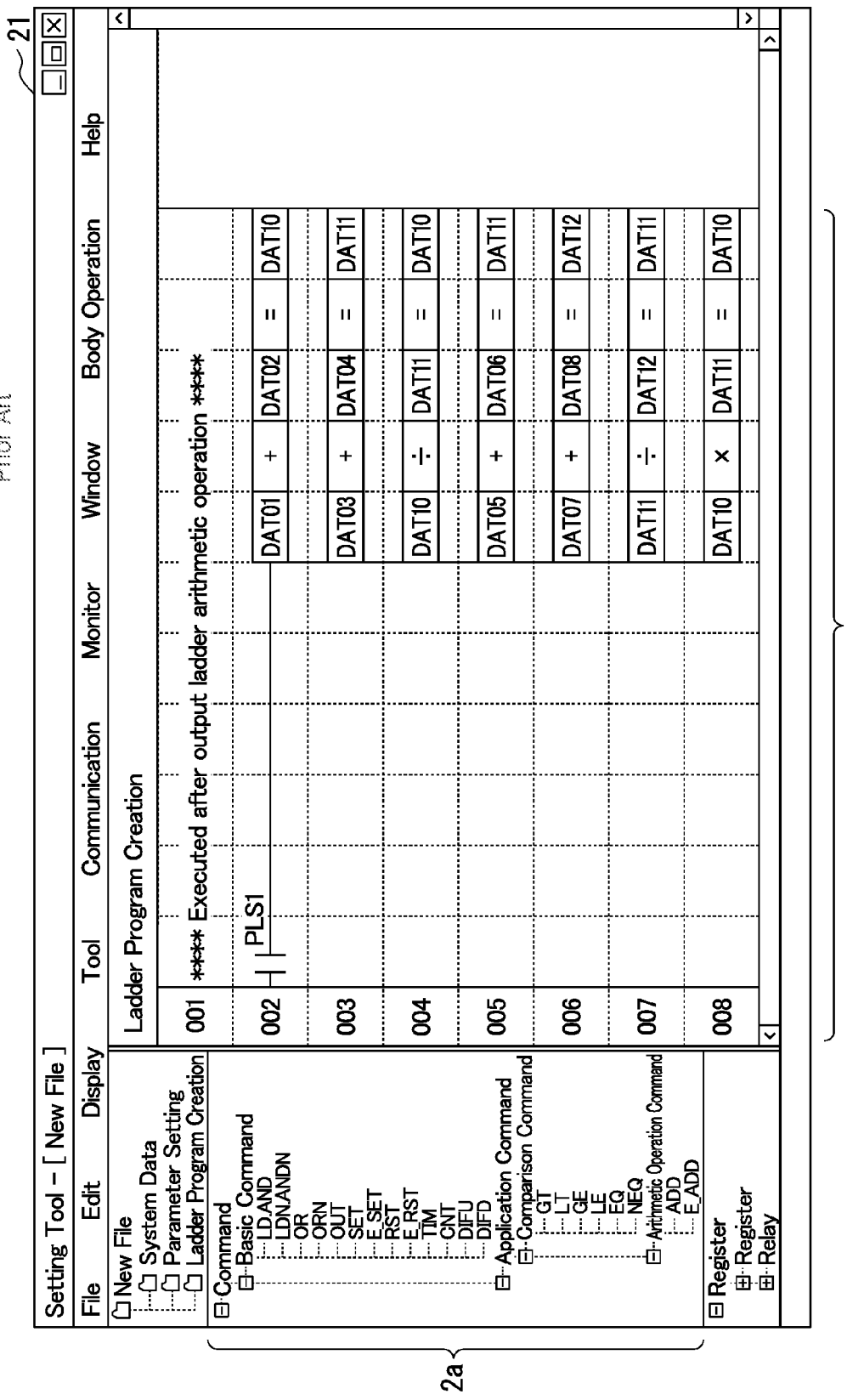
FIG. 8 is a view illustrating an example of a display screen on the personal computer when creating a ladder program based on the parameter setting tool program in accordance with the related art.
Figure 9:
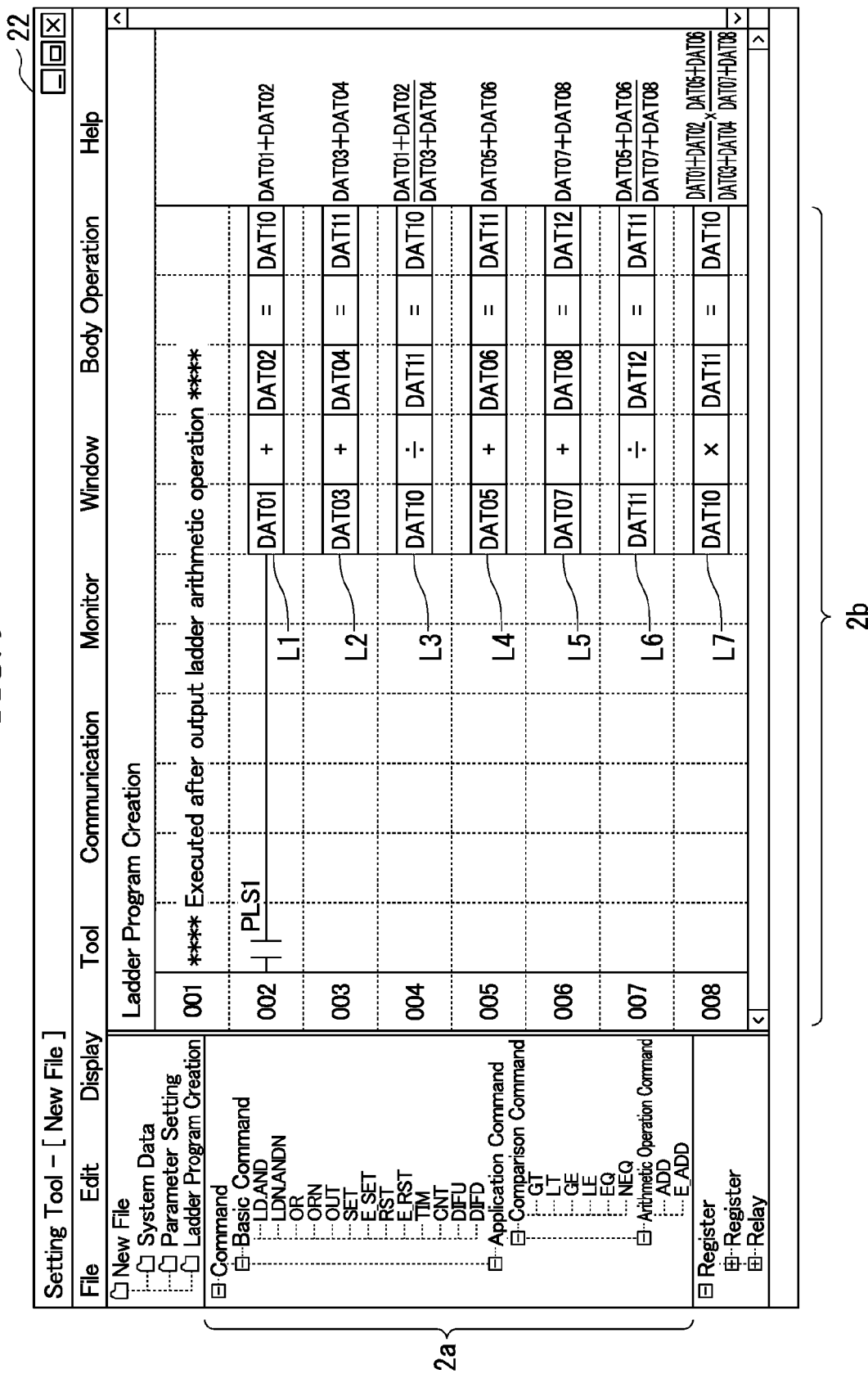
FIG. 9 is a view representing each of the lines of the ladder program displayed in the ladder program creation display screen in the form of equations when the ladder program of FIG. 8 is created in accordance with the related art.

In the ladder program creation apparatus in accordance with the first preferred embodiment of the present invention, a custom ladder command creation screen 23, which is illustrated in FIG. 2 and FIG. 3, is displayed on the display unit 20 of the personal computer 2. Also, a ladder program creation display screen 24, which is illustrated in FIG. 3, is displayed on the display unit 20 of the personal computer 2. The ladder program creation display screen 24 includes a command display area 3a and a program editing area 3b. The custom ladder command creation screen 23 is displayed on the display unit 20 of the personal computer 2, which is different from the ladder program creation apparatus in accordance with related art. The custom ladder command is displayed on the command display area 3a of the ladder program creation display screen 24, which is different from the ladder program creation display screen 21 of FIG. 8 in accordance with the related art.

A flow of the ladder program creation processing based on the ladder program creation apparatus in accordance with the first preferred embodiment of the present invention will be described.

In step S1 of FIG. 1, the user creates a desired custom ladder command on the custom ladder command creation screen 23. In the example shown in FIG. 2 and FIG. 3, the following custom ladder command is created on the custom ladder command creation screen 23.

Command name: CAST

Number of arguments: 2

$$\text{Equation: } ((\text{Argu01}+\text{DAT02})/(\text{DAT03}+\text{DAT04}))* \\ ((\text{Argu02}+\text{DAT06})/(\text{DAT07}+\text{DAT08}))$$

That is, the custom ladder command is created by the user inputting these parameters to the corresponding area of the custom ladder command creation screen 23. The custom ladder command information 11a is created, based on the created custom ladder command.

In step S2, if a registration button BTN provided on the custom ladder command creation screen 23 is operated, the created custom ladder command information 11a is registered and stored in a command listing table 11b, along with the standard commands, including a plurality of basic commands and application commands based on a conventional parameter setting tool program 3.

If the custom ladder command information 11a is registered and stored in the command listing table 11b, the custom ladder command is displayed in the command display area 3a of the ladder program creation display screen 24 shown in FIG. 3, along with the basic commands and application commands.

After that, in step S3, the desired ladder program is created by selecting desired commands from the standard commands and the custom ladder commands registered and stored in the command listing table 11b.

Specifically, desired commands are selected from the basic commands, application commands, and custom ladder commands displayed in the command display area 3a of the ladder program creation screen 24 shown in FIG. 3, and the selected commands are placed at the prescribed positions in the program editing area 3b, so as to create/input/set the desired ladder program. Here, as shown in FIG. 3, the names of the basic commands, application commands, and custom ladder commands are displayed in the command display area 3a.

Figure 4:
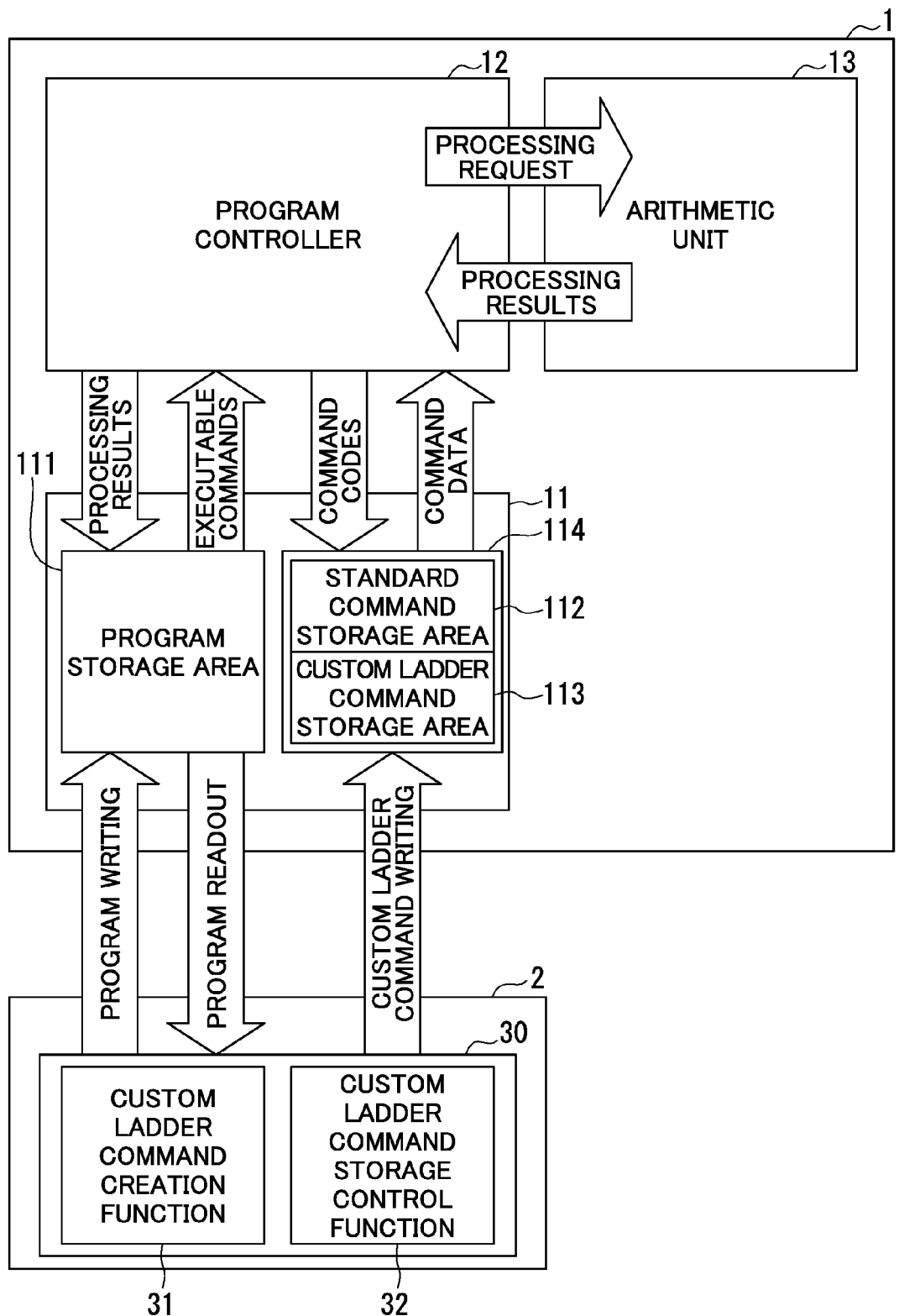
FIG. 4 is a configuration drawing describing the main part of the ladder program creation apparatus in accordance with the first preferred embodiment of the present invention.

Next, the operation of the ladder program creation apparatus in accordance with the first preferred embodiment will be described. FIG. 4 is a configuration drawing describing the main part of the ladder program creation apparatus in accordance with the first preferred embodiment of the present invention. In FIG. 4, elements that are in common with FIG. 7 are assigned the same reference numerals.

The ladder program creation apparatus includes the indicating controller 1, the personal computer 2, and the parameter setting tool program 3 installed in the personal computer 2.

The indicating controller 1 includes a main memory 11, a program controller 12, and an arithmetic unit 13. The main memory 11 includes a program storage unit 111 and a command listing table storage unit 114. The command listing table storage unit 114 includes a standard command information storage unit 112 and a custom ladder command information storage unit 113.

As shown in FIG. 2, standard command information and custom ladder command information are registered in a command listing table 11b. The standard command information storage unit 112 stores the standard commands as shown in the command listing table 11b of FIG. 2. The custom ladder command information storage unit 113 stores the custom ladder command information as shown in the command listing table 11b of FIG. 2. The command listing table storage unit 114 stores the command listing table 11b.

The program storage unit 111 stores the ladder program. The arithmetic unit 13 performs calculations based on processing requests from the program controller 12, and outputs the results of processing to the program controller 12.

The program controller 12 receives executable commands from the program storage unit 111 of the memory area 11, and outputs the results of processing to the program storage unit 111. Also, the program controller 12 receives command data from the command listing table 11b in the command listing table storage unit 114, and outputs command codes to the command listing table 11b in the command listing table storage unit 114. Also, the program controller 12 outputs processing requests to the arithmetic unit 13, and receives processing results from the arithmetic unit 13.

The parameter setting tool program 3 is installed in the personal computer 2 so as to constitute a parameter setting unit 30. The parameter setting unit 30 includes a custom ladder command information creation unit 31 and a custom ladder command information storage control unit 32.

The parameter setting unit 30 writes the ladder program into the program storage unit 111 of the main memory 11, and reads out the ladder program from the program storage unit 111. Also, the parameter setting unit 30 writes custom ladder command information into the command listing table 11b in the command listing table storage unit 114.

The custom ladder command information creation unit 31 has a function of creating the custom ladder command information in the parameter setting tool program 3. Specifically, in the custom ladder command information creation unit 31, as the above description of step S1, the custom ladder command is created by the user inputting various parameters to the custom ladder command creation screen 23 displayed on the display unit 20. The custom ladder command information 11a is created based on the created custom ladder command.

The custom ladder command information storage control unit 32 has a function of making the created custom ladder command information 11a stored in the command listing table 11b. Specifically, in the custom ladder command information storage control unit 32, as the above description of step S2, if the registration button BTN provided on the custom ladder command creation screen 23 is operated, the created custom ladder command information 11a is registered and stored in a command listing table 11b, along with the standard commands, including a plurality of basic commands and application commands based on a conventional parameter setting tool program 3.

Figure 5:
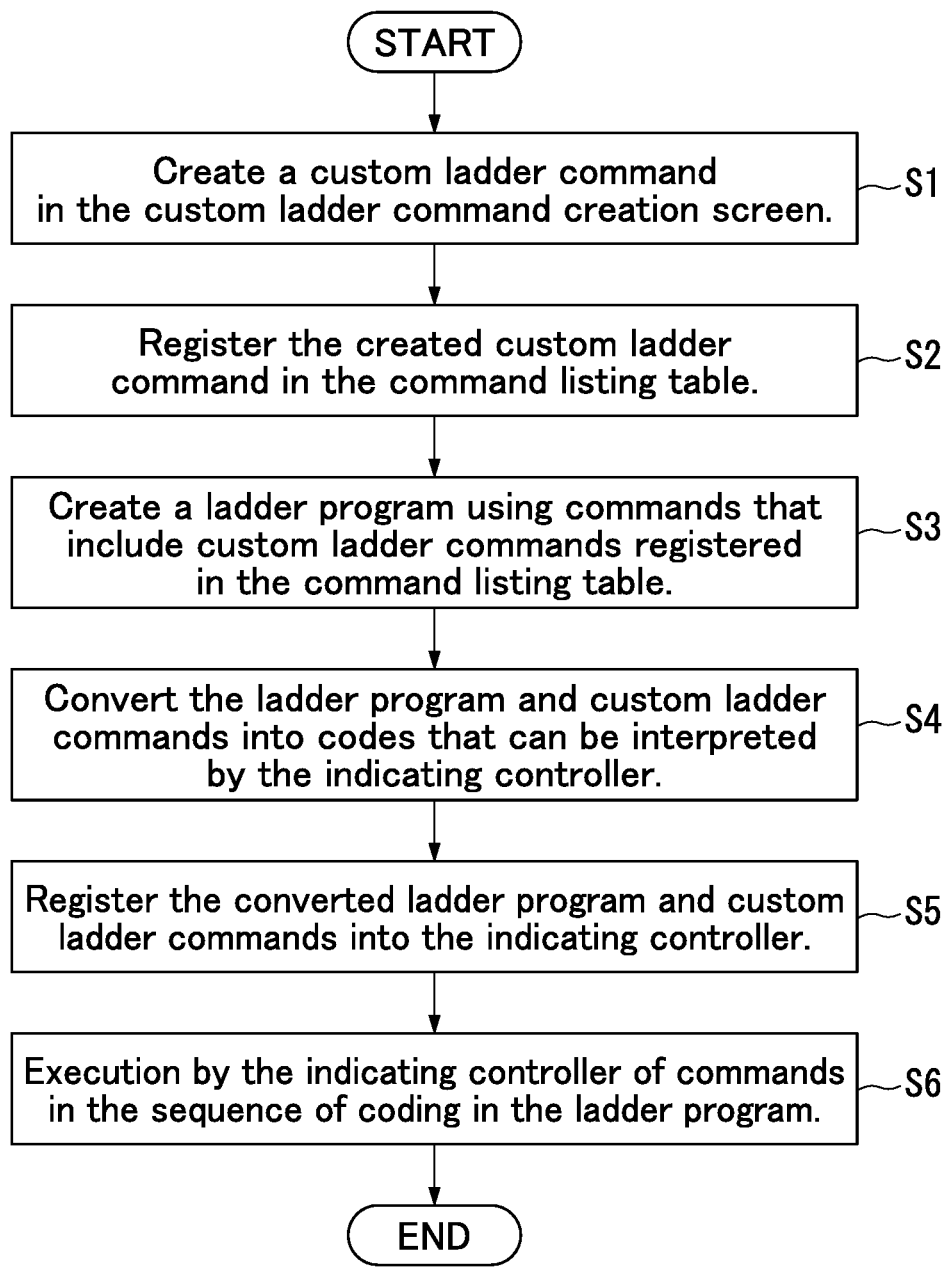
FIG. 5 is a flowchart that describes the flow of operation of the ladder program generation apparatus of FIG. 4 in accordance with the first preferred embodiment of the present invention.

FIG. 5 is a flowchart that describes the flow of operation of the ladder program creation apparatus of FIG. 4 in accordance with the first preferred embodiment of the present invention.

In step S1, the user creates a desired custom ladder command on the custom ladder command creation screen 23. In the example of FIG. 2 and FIG. 3, the following custom ladder commands are created on the custom ladder command creation screen 23.

Command name: CAST
Number of arguments: 2

$$\text{Equation: }((\text{Argu}01+\text{DAT}02)/(\text{DAT}03+\text{DAT}04))*\\((\text{Argu}02+\text{DAT}06)/(\text{DAT}07+\text{DAT}08))$$

That is, the custom ladder command is created by the user inputting these parameters to the corresponding area of the custom ladder command creation screen 23. The custom ladder command information 11a is created, based on the created custom ladder command.

Then, in step S2, if a registration button BTN provided on the custom ladder command creation screen 23 is operated, the created custom ladder command information 11a is registered and stored in a command listing table 11b, along with the standard commands, including a plurality of basic commands and application commands based on a conventional parameter setting tool program 3.

If the custom ladder command information 11a is registered and stored in the command listing table 11b, the name of the custom ladder command is displayed in the command display area 3a of the ladder program creation display screen 24 shown in FIG. 3, along with the names of the basic commands and application commands.

After that, in step S3, the desired ladder program is created by selecting desired commands from the standard commands and the custom ladder commands registered and stored in the command listing table 11b.

Specifically, desired commands are selected from the basic commands, application commands, and custom ladder commands displayed in the command display area 3a of the ladder program creation screen 24 shown in FIG. 3, and the selected commands are placed at the prescribed positions in the program editing area 3b, so as to create/input/set the desired ladder program.

Next, in step S4, the indicating controller 1 converts the ladder program and custom ladder commands into codes that indicating controller 1 itself can interpret.

Then, in step S5, the indicating controller 1 stores the converted ladder program and custom ladder commands in the indicating controller 1 itself.

Then, in step S6, the indicating controller 1 executes processing of the prescribed commands in the sequence in which they are coded in the ladder program.

Figure 6:
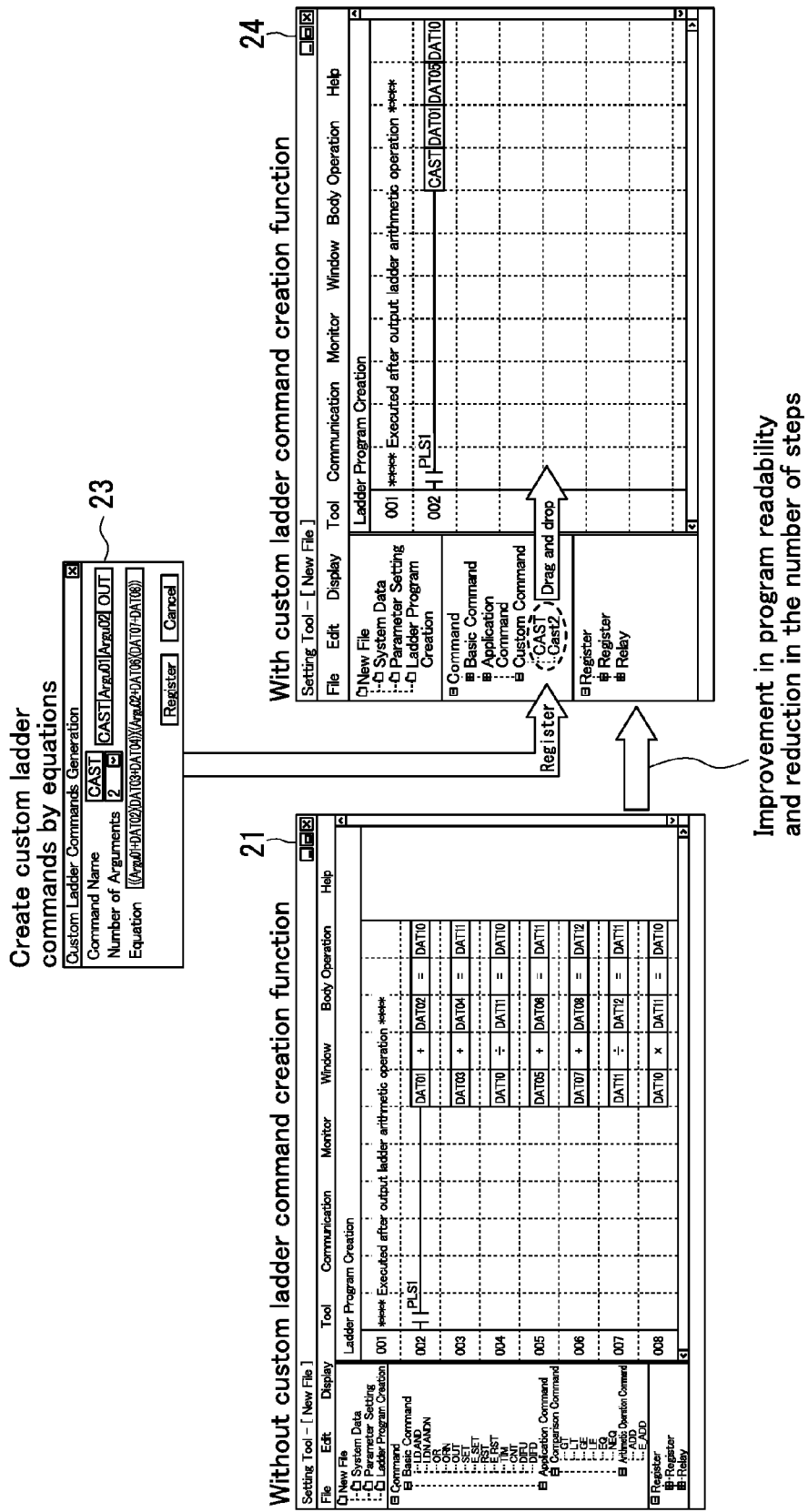
FIG. 6 is a drawing that compares the ladder program creation screen in accordance with the related art with the ladder program creation screen in accordance with the first preferred embodiment of the present invention, based on whether or not there is a custom ladder command creation function.

FIG. 6 is a drawing that compares the ladder program creation screen in accordance with the related art with the ladder program creation screen in accordance with the first preferred embodiment of the present invention, based on whether or not there is a custom ladder command creation function. The ladder program creation screen 21 is an example of the ladder program creation screen in accordance with the related art for the case in which there is no custom ladder command creation function of the same type shown in FIG. 8. The custom ladder command creation screen 23 is an example of the custom ladder command creation screen of the same type shown in FIG. 3. The ladder program creation screen 24 is an example of the ladder program creation screen of the same type shown in FIG. 3

As is clear from FIG. 6, by providing the custom ladder command creation function in accordance with the preferred embodiment of the present invention, the readability of the ladder program is greatly improved.

Although the foregoing preferred embodiment is described for an example in which custom ladder commands are coded as equations, this is not a restriction in the present invention, and the custom ladder command may be coded in a programming language such as C language or Basic. By coding the custom ladder command in a programming language, it is possible to expect easy support of communication and information processing.

The ladder program creation apparatus in accordance with the preferred embodiment of the present invention enables simple creation and input of user-specific custom ladder commands, and that enables, for example, the specific details of the original equations to be read easily from the created ladder program.

The ladder program creation apparatus in accordance with the preferred embodiment of the present invention makes it possible to easily reuse a user-specific custom ladder command as a ladder program component.

Also, according to the ladder program creation apparatus in accordance with the preferred embodiment of the present invention, by coding user-specific custom ladder commands as equations, it is possible to easily read the specific details of the original equations.

According to the ladder program creation apparatus in accordance with the preferred embodiment of the present invention, by coding user-specific custom ladder commands in a programming language, it is possible to easily support communication and information processing.

As described above, the preferred embodiment of the present invention enables implementation of a ladder program creation apparatus capable of simple creation and inputting of custom ladder commands unique to a user.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A ladder program creation apparatus comprising:
a command listing table storage configured to store a command listing table, the command listing table registering a standard command and a custom ladder command that constitute a ladder program;
a custom ladder command creation screen configured to create the custom ladder command based on an operation by a user typing an arithmetic equation on the custom ladder command creation screen;
a custom ladder command storage controller configured to register the custom ladder command, which has been created by the custom ladder command creation screen, and the standard command in the command listing table; and
a ladder program creation screen configured to display a command display area and a program editing area, the command display area displaying names of the standard command and the custom ladder command that have been registered in the command listing table, the program editing area being constituted to create a desired ladder program by dragging and dropping a desired command selected from the standard command and the custom ladder command displayed in the command display area.

2. The ladder program creation apparatus according to claim 1, further comprising:
a program storage configured to store the ladder program that has been created; and
a parameter setting section including the custom ladder command creation screen and the custom ladder command storage controller,
wherein the parameter setting section is configured to
write the ladder program, which has been created, into the program storage,
read out the ladder program from the program storage, and
write the custom ladder command into the command listing table in the command listing table storage.

3. The ladder program creation apparatus according to claim 2, further comprising:
an arithmetic section configured to perform calculations; and
a program controller configured to receive executable commands from the program storage, output results of processing to the program storage, receive command data from the command listing table in the command listing table storage, output command codes to the command listing table in the command listing table storage, output processing requests to the arithmetic section, and receive processing results from the arithmetic section.

4. The ladder program creation apparatus according to claim 1, wherein
the custom ladder command creation screen includes a registration button, and
if the registration button is operated, then the created custom ladder command is registered in the command listing table, along with the standard command.

5. The ladder program creation apparatus according to claim 1, wherein the custom ladder command is coded as an equation.

6. The ladder program creation apparatus according to claim 1, wherein the custom ladder command is coded in a programming language.

7. A ladder program creation method comprising:
- creating a custom ladder command by using a custom ladder command creation screen based on an operation by a user typing an arithmetic equation on the custom ladder command creation screen;
- registering the custom ladder command, which has been created, in a command listing table;
- displaying names of standard command and the custom ladder command, which have been registered in the command listing table, in a command display area in a display unit;
- creating a desired ladder program by selecting desired commands from the standard command and the custom ladder command, the names of which have been displayed in the command display area, and by dragging and dropping the selected commands from the command display area to a program editing area in the display unit.

8. The ladder program creation method according to claim 7, further comprising:
- writing the ladder program, which has been created, into a program storage;
- reading out the ladder program from the program storage; and
- writing the custom ladder command information into the command listing table.

9. The ladder program creation method according to claim 8, further comprising:
- receiving executable commands from the program storage;
- outputting results of processing to the program storage;
- receiving command data from the command listing table;
- outputting command codes to the command listing table;
- outputting processing requests to an arithmetic section; and
- receiving processing results from the arithmetic section.

10. The ladder program creation method according to claim 7, further comprising:
- registering the created custom ladder command in the command listing table, along with the standard command if a registration button included in the custom ladder command creation screen is operated.

11. The ladder program creation method according to claim 7, further comprising:
- converting the ladder program and the custom ladder command into codes that an indicating controller itself can interpret;
- registering the converted ladder program and the custom ladder command in the indicating controller; and
- executing processing of prescribed commands in a sequence in which the prescribed commands are coded in the ladder program.

12. The ladder program creation method according to claim 7, wherein the custom ladder command is coded as an equation.

13. The ladder program creation method according to claim 7, wherein the custom ladder command is coded in a programming language.

14. A computer program product embodied on a non-transitory computer readable medium, the computer program product comprising:
- instructions to create a custom ladder command by using a custom ladder command creation screen based on an operation by a user typing an arithmetic equation on the custom ladder command creation screen;
- instructions to register the custom ladder command, which has been created, in a command listing table;
- instructions to display names of standard command and the custom ladder command, which have been registered in the command listing table, in a command display area in a display unit;
- instructions to create a desired ladder program by selecting desired commands from the standard command and the custom ladder command, the names of which have been displayed in the command display area, and by dragging and dropping the selected commands from the command display area to a program editing area in the display unit.

15. The computer program product according to claim 14, further comprising:
- instructions to display the custom ladder command creation screen on which the user creates desired the custom ladder command.

16. The computer program product according to claim 15, further comprising:
- instructions to register the created custom ladder command in the command listing table, along with the standard command if a registration button included in the custom ladder command creation screen is operated.

17. The computer program product according to claim 14, further comprising:
- instructions to convert the ladder program and the custom ladder command into codes that a indicating controller itself can interpret;
- instructions to register the converted ladder program and the custom ladder command in the indicating controller; and
- instructions to execute processing of prescribed commands in a sequence in which the prescribed commands are coded in the ladder program.

* * * * *